US008877885B2

(12) United States Patent
Vyakaranam et al.

(10) Patent No.: US 8,877,885 B2
(45) Date of Patent: Nov. 4, 2014

(54) TIN FREE SILYL-TERMINATED POLYMERS

(75) Inventors: Kamesh R. Vyakaranam, Pearland, TX (US); Ling Zhang, Missouri City, TX (US); William A. Koonce, Pearland, TX (US); Juan Carlos Medina, Lake Jackson, TX (US); Ganesh Kailasam, Pearland, TX (US); Rajat Duggal, Pearland, TX (US); Nathan Wilmot, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/704,162

(22) PCT Filed: Jun. 29, 2011

(86) PCT No.: PCT/US2011/042355
§ 371 (c)(1),
(2), (4) Date: Dec. 13, 2012

(87) PCT Pub. No.: WO2012/003212
PCT Pub. Date: Jan. 5, 2012

(65) Prior Publication Data
US 2013/0096252 A1    Apr. 18, 2013

Related U.S. Application Data

(60) Provisional application No. 61/360,199, filed on Jun. 30, 2010.

(51) Int. Cl.
*C08G 18/20* (2006.01)

(52) U.S. Cl.
CPC .............. *G08G 18/222* (2013.01); *C08G 18/20* (2013.01); *G08G 18/18* (2013.01); *G08G 18/837* (2013.01); *G08G 18/7621* (2013.01); *G08G 18/3893* (2013.01); *G08G 18/718* (2013.01); *G08G 18/7671* (2013.01); *G08G 18/289* (2013.01); *G08G 18/4825* (2013.01)
USPC .................. 528/15; 528/29; 528/31; 528/17; 528/21

(58) Field of Classification Search
USPC .......................................... 528/15, 29, 31, 17
See application file for complete search history.

(56) References Cited

U.S. PATENT DOCUMENTS

| 4,904,732 | A  |   | 2/1990  | Iwahara et al. |
|-----------|----|---|---------|----------------|
| 5,068,304 | A  |   | 11/1991 | Higuchi et al. |
| 5,182,174 | A  |   | 1/1993  | Stephenson |
| 5,227,434 | A  | * | 7/1993  | Katz ............................ 525/419 |
| 6,265,456 | B1 |   | 7/2001  | Austin et al. |
| 6,410,640 | B1 |   | 6/2002  | Fukunaga et al. |
| 6,503,995 | B2 |   | 1/2003  | Tsuji et al. |
| 6,649,016 | B2 |   | 11/2003 | Wu et al. |
| 8,084,566 | B2 |   | 12/2011 | Rautschek et al. |
| 2006/0111505 | A1 |   | 5/2006 | Schindler et al. |

FOREIGN PATENT DOCUMENTS

| JP | 05-125175 | * | 5/1993 |
| WO | 2011/150161 A2 | | 12/2011 |
| WO | 2013/048806 A1 | | 4/2013 |

OTHER PUBLICATIONS

English language translation JP 05-125175, May 1993.*
PCT/US2011/042355, International Preliminary Report on Patentability.
PCT/US2011042355, International Search Report.
PCT/US2011042355, Written Opinion of the International Searching Authority.

* cited by examiner

*Primary Examiner* — Margaret Moore

(57) ABSTRACT

Embodiments of the invention provide for methods of producing a composition comprising a crosslinkable silane-terminated polymer having at least one crosslinkable silyl group in each molecule. The method comprises providing a polymer having at least one unsaturated group and at least one alcoholic hydroxyl group in each molecule, adding to the polymer a compound having a hydrogen-silicon bond and a crosslinkable silyl group in each molecule and a hydrosilylation catalyst to thereby carry out a hydrosilylation reaction to form a composition comprising hydrosilylated polyoxyalkylene polymers, reacting the hydrosilylated polyoxyalkylene polymers with at least one isocyanate in the presence of a first tin-free catalyst to form an isocyanate reacted hydrosilylated polymer, and optionally reacting the isocyanate reacted hydrosilylated polymer with a polyol having a nominal functionality of at least 2 to form a polyol reacted crosslinkable silane-terminated polymer.

7 Claims, No Drawings

TIN FREE SILYL-TERMINATED POLYMERS

CROSS-REFERENCE TO RELATED APPLICATIONS

This application claims the benefit of U.S. Provisional Patent Application No. 61/360,199, filed on Jun. 30, 2010, and fully incorporated herein by reference.

FIELD OF THE INVENTION

Embodiments of the invention relate to silyl-modified polymers and methods of producing same.

BACKGROUND OF THE INVENTION

Crosslinkable silyl group-containing polyoxyalkylene polymers are widely used as raw material polymers in sealing materials, adhesives, coating materials and the like for architectural or industrial use. Such crosslinkable silyl group-containing polyoxyalkylene polymers may be produced according to various methods, such as hydrosilyation of vinyl terminated polyethers, aminosilane reaction with isocyanate terminated preopolymers, or isocyanatosilane reaction with hydroxyl-terminated prepolymers. However, many of these methods rely on the use of tin based catalyst which are under environmental scrutiny.

Therefore there is a need for crosslinkable silyl group-containing polymers that are made and are curable without the use of tin catalysts.

SUMMARY OF THE INVENTION

Embodiments of the invention provide for methods of forming crosslinkable silyl group-containing polymers that are made and are curable without the use of tin catalysts.

In one embodiment of the invention, a method of producing a composition comprising a crosslinkable silane-terminated polymer having at least one crosslinkable silyl group in each molecule is provided. The method comprises providing a polymer having at least one unsaturated group and at least one alcoholic hydroxyl group in each molecule and having a number average molecular weight of between about 100 and about 10000, adding to the polymer a compound having a hydrogen-silicon bond and a crosslinkable silyl group in each molecule and a hydrosilylation catalyst to thereby carry out a hydrosilylation reaction to form a composition comprising hydrosilylated polyoxyalkylene polymers, wherein the hydrosilylation reaction has a hydrosilylation efficiency of at least about 70% as determined by $^1$H-NMR, reacting the hydrosilylated polyoxyalkylene polymers with at least one isocyanate at an isocyanate index of between about 80 and about 250 and in the presence of a first tin-free catalyst to form an isocyanate reacted hydrosilylated polymers, and optionally reacting the isocyanate reacted hydrosilylated polymer with a polyol having a nominal functionality of at least 2 to form a polyol reacted crosslinkable silane-terminated polymer.

The method may further comprise curing at least one of the isocyanate reacted hydrosilylated polymers and the polyol reacted crosslinkable silane-terminated polymer in the presence of a second tin-free catalyst.

DESCRIPTION OF EMBODIMENTS OF THE INVENTION

Embodiments of the invention provide for crosslinkable silyl-terminated polymers (STP) that are made and are curable without the use of tin catalysts. In an embodiment of the invention, an STP may be obtained by the hydrosilylation of a polymer having at least one unsaturated group and at least one alcoholic hydroxyl group in each molecule. The hydrosilylated polymers may then be exposed to at least one isocyanate. If a low isocyanate index is used, a coupling reaction occurs resulting in all, or most of, the NCO groups being coupled with the alcoholic hydroxyl groups of the polymer having at least one unsaturated group and at least one alcoholic hydroxyl group in each molecule. If a high isocyanate index is used, NCO terminated prepolymers, or NCO capped polymers, are formed. Both the coupled polymers and the capped polymers may be moisture cured, however the capped polymer may optionally be coupled with a polyol in order to terminate the polyol with crosslinkable silyl groups.

The polymer having at least one unsaturated group and at least one alcoholic hydroxyl group is not particularly restricted, and may include any polymer as long as they include at least one unsaturated group (such as a carbon-carbon double bond or carbon-carbon triple bond) and at least one alcoholic hydroxyl group.

The polymer having at least one unsaturated group and at least one alcoholic hydroxyl group in each molecule may have a number average molecular weight of between about 100 and about 10000. All individual values and subranges from 100 to 10000 are included herein and disclosed herein; for example, the number average molecular weight can be from a lower limit of 100, 200, 300, 400, 500, 600, 700, 800, 900, 1000, 1250, 1500, 1750, 2000, 2500, 3000, 4000, 5000, 6000, or 7000 to, independently, an upper limit of 1000, 1250, 1500, 1750, 2000, 2500, 3000, 3500, 4000, 4500, or 5000, 6000, 7000, 8000, 9000, or 10000.

In some embodiments where the subsequent isocyanate index is low (i.e. at or below 100), the polymer having at least one unsaturated group and at least one alcoholic hydroxyl group in each molecule may have a number average molecular weight of between about 4000 and about 10000. In other embodiments, where the subsequent isocyanate index is high (i.e. above 100), the polymer having at least one unsaturated group and at least one alcoholic hydroxyl group in each molecule may have a number average molecular weight of between about 100 and about 5000.

In one embodiment, the polymer having at least one unsaturated group and at least one alcoholic hydroxyl group in each molecule may be a polyoxyalkylene polymer as described in co-pending U.S. Provisional Patent Application No. 61/348,996, filed May 27, 2010, and entitled "Methods for Producing Crosslinkable Silyl Group-Containing Polyoxyalkylene Polymers," which is hereby incorporated by reference in its entirety.

In one embodiment, the polymer having at least one unsaturated group and at least one alcoholic hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The alcoholic hydroxyl-containing compound may include allyl alcohol, methallyl alcohol, trimethylolpropane monoallyl ether, trimethylolpropane diallyl ether, glycerol monoallyl ether, glycerol diallyl ether; ethylene oxide adducts or propylene oxide adducts thereof and like compounds containing at least one unsaturated group and at least one alcoholic hydroxyl group in each molecule; hydroxyl-terminated hydrocarbon compounds such as hydroxyl-terminated polybutadiene; and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcoholic hydroxyl group in each molecule may be a propylene glycol monoallyl ether having a number average molecular weight between about 600 and about 100, and an OH number of between about 50 and about 90.

The polymer having at least one unsaturated group and at least one alcoholic hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

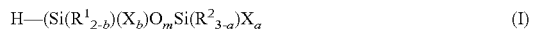

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of $-SiR^1_{2-b})(X_b)O$-groups may be the same or different with each other or one another; and m represents an integer from 0 to 19 provided that the relation a+Σb≥1 should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (I) may include the compounds represented by the general formula (II):

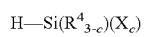

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^4$ groups, they may be the same or different; $R^3$ is a univalent hydrocarbon group containing 1 to 20 carbon atoms and the three $R^5$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis (methyl ethyl ketoximato)methylsilane and tris(acetoximato) silane; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 part by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or between the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcoholic hydroxyl group in each molecule are hydrosilylated with a hydrosilylation efficiency of at least about 70%, such as between about 70% and about 100%. All individual values and subranges from about 70 to about 100 are included herein and disclosed herein; for example, the hydrosilylation efficiency can be from a lower limit of about 70, 75, 80, 90, or 92%, to, independently, an upper limit of about 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%. As used herein, the "hydrosilylation efficiency"=[100×((number of unsaturation groups on the polyol hydrosilylated)/(total number of unsaturation groups on the polyol that were initially available for hydrosilylation)], and may be measured using $^1$H-NMR.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be coupled or capped with a polyisocyanate compound.

Among the coupling and capping agents usable in the practice of the embodiments of the invention, the polyisocyanate compounds, namely compounds having two or more isocyanato groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

The coupling reaction may be performed at an isocyanate index of 100 or less, such as for example between about 80 and about 100, or between about 90 and about 100. At such indexes, both NCO groups of the isocyanates are reacted with the hydroxyl groups of the hydrosilylated polymer, resulting in a polymer with two terminal silyl groups. The capping reaction may be performed at an isocyanate index of above 100 to about 250. All individual values and subranges from above 100 to below 250 are included herein and disclosed herein; for example, the isocyanate index can be from a lower limit of above 100, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180. At such indexes at least a portion of the hydrosilylated polymer will be NCO terminated prepolymers (NCO capped).

As used herein, the isocyanate index is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

For increasing the rate of reaction or improving the degree of conversion a catalyst may be used. The catalyst may be a tin free catalyst, such as zinc octoate, 1,8 diaza-bicyclo(5,4,0) undecene-7 (DBU), acid blocked DBU, such as for example acrylic acid blocked DBU, titanium catalysts such as organometallic titanium catalysts, or combinations thereof.

The isocyanate capped polymers may be coupled with a polyol having a nominal functionality of at least 2 to form the final silyl-terminated polymers. Any suitable polyol may be used. In one embodiment, a polyether polyol is used. In certain embodiments, polyether polyols having nominal functionalities of between about 2 and about 4 is used. In one embodiment, the nominal functionality is about 2, and in another about 3. In certain embodiments, polyether polyols may be used.

Polyether polyols may be prepared by adding an alkylene oxide, such as ethylene oxide, propylene oxide, butylene oxide or a combination thereof, to an initiator having from 2 to 8, preferably 2 to 4 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The initiator may be selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In one embodiment, the initiator is a mixture of 1,3-cyclohexanedimethanol and 1,4-cyclohexanedimethanol and is commercially available under the trade name UNOXOL from The Dow Chemical Company which is an approximate 1:1 mixture of (cis, trans) 1,3-cyclohexanedimethanol and (cis, trans) 1,4-cyclohexanedimethanol. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

The coupling reaction of the isocyanate capped polymers with the polyol having a nominal functionality of at least 2 may be catalyzed by the same types of catalyst suitable for the capping reaction above. Alternatively, the catalyst used in the capping reaction may carried forward and used in the coupling reaction.

The resulting silyl-terminated polymers may have viscosities that are below about 50 Pa·s, such as below 45, 40, 35, 30, 25, 20, 15, 10, or 8 Pa·s.

According to the embodiments of the invention, the resulting silyl-terminated polymers (resulting from either the NCO capping reaction or NCO coupling reaction) may be useful, among other things, to be reacted with one another to further lengthen the molecular chains for uses such as sealants, adhesives, and coatings, and combinations thereof. When silyl polymers are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of the embodiments of the invention are bonded to form an infusible elastomeric material. To avoid premature curing, the compositions of the embodiments of the invention may be stored and maintained in the absence of moisture until cure is desired. Then, when cure is desired, the polymer may be exposed to atmospheric or other moisture.

The resulting silyl-terminated polymers are storage stable. That is, if stored in a moisture free environment, the silyl-terminated polymers will exhibit substantially the same viscosity profile after having been stored for a set number of days, such as for example 40 days, as it exhibited before storage. The silyl-terminated polymers may exhibit this storage stability even if stored in the presence of a curing catalyst, such as those described below.

The reaction of curing of the silyl-terminated polymer may be facilitated by use of a tin free silanol condensation catalyst or curing accelerator. Silanol condensation catalysts or accelerators include the following: titanic acid esters, such as tetrabutyl titanate, tetrapropyl titanate, and the like; organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. Other condensation catalysts or curing accelerators include dodecyl benzene sulfonic acid, acid blocked tertiary amine(1,8-Diazabicyclo[5.4.0]undec-7-ene) catalysts such as TOYOCAT-DB30 and TOYOCAT-DB41 available from Tosoh Corporation, and boron trifluoride amine complexes such as ANCHOR-1040 available from Air Products. These silanol condensation catalysts may be used individually or in combinations. The catalyst may be present in an amount of about at least about 0.1 percent by weight of the polymer, at least about 0.5 percent by weight of the polymer, at least about 1 percent by weight of the polymer, at least about 1.5 percent by weight of the polymer, or at least about 2 percent by weight of the polymer and at most about 8 percent by weight of the polymer, at most about 6 percent by weight of the polymer, at most about 5 percent by weight of the polymer, at most about 4 percent by weight of the polymer, or at most about 3.5 percent based on weight of the polymer. Such catalysts may be combined with the polymer by means within the skill in the art during the formulation of the sealant, coating, or adhesive.

The resulting cured silyl polymers are also embodiments of the invention. Similarly, the embodiments of the invention includes the sealants, adhesives, and coatings and other end uses comprising these polymers or prepolymers. Preferred properties for the silyl polymers may differ somewhat for each end use as do other components that are optionally present in compositions suitable for each.

EXAMPLES

The following examples are provided to illustrate the embodiments of the invention, but are not intended to limit the scope thereof. All parts and percentages are by weight unless otherwise indicated.

The following materials were used:

| | |
|---|---|
| Allyl monol 1 | A propylene monoallyl ether, and number average molecular weight of about 6238. |
| Allyl monol 2 | A propylene glycol monoallyl ether having an allylic content of 3.5 wt % (0.998 mol of unsat/mol monol), a number average molecular weight of about 800, and an OH number of 70 or 2.1 wt % OH. |
| ACCLAIM Polyol 8200 | A long-chain difunctional polyether polyol based on propylene oxide with a molecular weight of about 8000 and a hydroxyl number of 14 mg KOH/g, available from Bayer MaterialScience. |

-continued

| | |
|---|---|
| Karstedt's catalyst | Platinum-divinyltetramethyldisiloxane and xylene as carrier solvent, the Pt loading in the catalyst is 2 wt %, available from Gelest, Inc. |
| Methyldimethoxysilane | Available from Gelest, Inc. |
| ISONATE* 50 OP | A 50 percent 4,4'-methylene diphenyl isocyanate, 50 percent 2,4'-methylene diphenyl isocyanate mixture having a functionality of 2.0 and an equivalent weight of 125 g/equivalent available from The Dow Chemical Company. |
| VORANATE* T-80 | A toluene diisocyanate (80% 2,4-toluene diisocyanate and 20% 2,6-toluene diisocyanate by weight) composition, available from The Dow Chemical Company. |
| DABCO T-12 | A tin catalyst available from Air Products. |
| DBTA | Dibutyltin bis(acetylacetonate), Available from Sigma-Aldrich Co. |
| DBTDL | Dibutyltin dilaurate, available from Aldrich. |
| SnAcAc | Tin (II) Acetylacetonate, available from Aldrich. |
| DBU | 1,8-Diazabicyclo[5.4.0]undec-7-ene, available from Aldrich. |
| Zn Octoate | Available from Shepherd Chemical Corporation. |
| SNAPCURE 3030 | A titanium based catalyst, available from Johnson Matthey plc. |
| TOYOCAT-DB30 | Acrylic acid blocked tertiary amine (1,8-Diazabicyclo[5.4.0]undec-7-ene) catalyst which deblocks at 30° C., available from Tosoh Corporation. |
| TOYOCAT-DB41 | Acid blocked tertiary amine (1,8-Diazabicyclo[5.4.0]undec-7-ene) catalyst which deblocks at 60° C., available from Tosoh Corporation. |
| DDBSA | Dodecyl benzene sulfonic acid. Available from Aldrich. |
| ANCHOR-1040 | A boron trifluoride amine complex. Available from Air Products. |

* ISONATE and VORANATE are trademarks of The Dow Chemical Company.

Test Methods

Tensile strength was measured according to ASTM standard test D1708. Elongation at break was measured according to ASTM standard test D1708. 100% Secant Modulus was measured according to ASTM standard test D1708. The number average molecular weight was determined by gel permeation chromatography using PEG standards, according to ASTM standard test D5296. Viscosity was measured using a rheometer AR2000 by TA Instruments. Approximately 1 mL of sample was dispensed into a 60 mm diameter 60-degree cone and plate geometry. After removal of any excess material, the viscosity test was performed by heating the sample from 20° C. to 100° C. at 3° C./min Shear rate of the test was kept constant at 0.1 s$^{-1}$.

Example E1-E3 and Comparative Examples CE1-CE3

A hydrosilylation reaction was performed by charging Allyl monol 1 (300 g) into a 4-necked 250 mL pre-dried glass reactor equipped with a mechanical stirrer. Karstedt's catalyst (Approximately 0.03 g) was then added to the reactor and mixed for 2 minutes under a continuous nitrogen purge. Methyldimethoxysilane (5.37 g) was added last and mixed for 5 minutes before the entire reactor was heated to 60° C. for 2 hours. The hydrosilylation product (hereinafter referred to as Hydrosilylated Polyether 1) was analyzed using $^1$H-showing a hydrosilylation efficiency of >82%.

NCO-coupling reactions was carried out by charging Hydrosilylated Polyether 1 and catalyst into a 250 mL 4-neck pre-dried glass reactor equipped with a mechanical stirrer and padded with nitrogen. A continuous nitrogen purge was started as ISONATE 50 OP was added to the reactor. The NCO-coupling reactions were let to take place over 4 hours at 70° C. at 300 rpm mixing speed.

The resulting hydrosilylated polyether polyurethanes (hereinafter referred to as HPPU) were then used to form cured films drawn down on polypropylene sheets at 25 Mil. The films were then cured at 25° C. and 50% relative humidity for two weeks. The amounts of components used and type of catalyst used is given in Table 1 as well as the physical properties of the HPPU (Major GPC molecular weight peaks and viscosity at 25° C.) and the corresponding cured films (tensile strength, elongation at break, and secant Modulus). The films (Examples E1-E3 and Comparative Example CE2) were then submerged in water for seven days and the tensile strength, elongation at break, and secant Modulus were measured on the water exposed films.

TABLE 1

| | HPPU 1 | HPPU 2 | HPPU 3 |
|---|---|---|---|
| Hydrosilylated Polyether 1 (g) | 100 | 100 | 100 |
| ISONATE 50 OP (g) | 2.0 | 2.0 | 2.0 |
| NCO Coupling Catalyst | DBTDL | DBU | Zn Octoate |
| NCO Coupling Catalyst (g) | 0.03 | 0.03 | 0.03 |
| Major GPC molecular weight peaks | 9807, 4763 | 10849, 5449 | 12068, 5779 |
| Viscosity at 25° C.(cP) | 5800 | 10600 | 14800 |

| | CE1 | E1 | E2 | CE2 | E3 | CE3 |
|---|---|---|---|---|---|---|
| HPPU | HPPU 1 | HPPU 2 | HPPU 2 | HPPU 2 | HPPU 3 | HPPU 3 |
| HPPU (g) | 12 | 12 | 12 | 12 | 12 | 12 |
| Curing Catalyst | SnAcAc | TOYOCAT-DB30 | TOYOCAT-DB41 | SnAcAc | TOYOCAT-DB41 | SnAcAc |
| Curing Catalyst (g) | 0.05 | 0.05 | 0.05 | 0.05 | 0.05 | 0.05 |
| Secant Modulus (psi) | 3.9 ± 0.6 | 1.9 ± 1.2 | 2.5 ± 0.8 | 4.3 ± 2.2 | 1.9 ± 0.33 | 6.0 ± 1.2 |
| Secant Modulus, H$_2$O 7 days (psi) | | 4.4 ± 0.7 | 3.4 ± 1.1 | 4.1 ± 0.6 | 1.8 ± 0.7 | |

TABLE 1-continued

| | | | | | | |
|---|---|---|---|---|---|---|
| Elongation at Break (%) | 941.1 ± 74.5 | 1168.2 ± 115.5 | 1161.9 ± 73.9 | 1139.9 ± 132.3 | 1271.4 ± 96.5 | 699.7 ± 72.7 |
| Elongation at Break, $H_2O$ 7 days (%) | | 1103.5 ± 55.1 | 1224.6 ± 62.9 | 1060.2 ± 143.5 | 1255.1 ± 120.8 | |
| Tensile Strength (psi) | 44.9 ± 17.6 | 33.6 ± 5.1 | 31.5 ± 3.9 | 37.0 ± 7.4 | 26.5 ± 2.6 | 34.6 ± 4.6 |
| Tensile Strength, $H_2O$ 7 days (psi) | | 45.8 ± 3.0 | 37.1 ± 6.9 | 37.6 ± 2.3 | 27.8 ± 2.9 | |

Example E4-E10 and Comparative Examples CE4 and CE5

A hydrosilylation reaction was performed by charging Allyl monol 2 (343.20 g) into a 4-necked 250 mL pre-dried glass reactor equipped with a mechanical stirrer. Karstedt's catalyst (Approximately 0.03 g) was then added to the reactor and mixed for 2 minutes under a continuous nitrogen purge. Methyldimethoxysilane (50.02 g) was added last and mixed for 5 minutes before the entire reactor was heated to 60° C. for 2 hours. The hydrosilylation product (hereinafter referred to as Hydrosilylated Polyether 2) was analyzed using $^1$H-showing a hydrosilylation efficiency of >95%.

The Hydrosilylated Polyether 2 was then reacted with excess ISONATE 50 OP or VORANATE T-80 in the presence of zinc octoate catalyst at 70° C. and at 300 rpm mixing speed for 5 hours to produce either a MDI or TDI capped hydrosilylated polyether, respectively. The capped hydrosilylated polyether were then reacted with ACCLAIM 8200 polyol at 70° C. for 2 hours.

The resulting hydrosilylated polyether polyurethanes were then cured at 25° C. and 50% relative humidity for two weeks.

The amounts of components used and type of catalyst used is given in Table 2 as well as the physical properties of the HPPU (Major GPC molecular weight peaks and viscosity at 25° C.) and the corresponding cured films (tensile strength, elongation at break, and secant Modulus).

TABLE 2

| | MDI HPPU | TDI HPPU |
|---|---|---|
| Hydrosilylated Polyether 2 (g) | 56.5 | 299.8 |
| ISONATE 50 OP (g) | 15.7 | |
| VORANATE T-80 | | 49.0 |
| Zn Octoate | 0.003 | 0.015 |
| ACCLAIM 8200 | 250.00 | 949.7 |
| Major GPC molecular weight peaks | 16414, 8103 | 9103., 5188 |
| Viscosity at 25° C.(cP) | 87,000 | 15000 |

| | E4 | CE4 | E5 | E6 | E7 | E8 | CE5 | E9 | E10 |
|---|---|---|---|---|---|---|---|---|---|
| HPPU | MDI HPPU | MDI HPPU | MDI HPPU | MDI HPPU | MDI HPPU | TDI HPPU | TDI HPPU | TDI HPPU | TDI HPPU |
| HPPU (g) | 12 | 12 | 12 | 12 | 12 | 12 | 12 | 12 | 12 |
| Curing Catalyst | DDBSA | SnAcAc | DB-41 | DB-30 | A-1040 | DDBSA | SnAcAc | DB-41 | DB-30 |
| Curing Catalyst (g) | 0.01 | 0.05 | 0.05 | 0.05 | 0.05 | 0.05 | 0.05 | 0.05 | 0.05 |
| Secant Modulus (psi) | 17.6 ± 2.9 | 13.2 ± 1.6 | 5.9 ± 2.0 | 3.1 ± 0.9 | 2.4 ± 3.2 | 7.9 ± 0.6 | 8.0 ± 0.8 | 3.9 ± 0.7 | 3.9 ± 01.6 |
| Elongation at Break (%) | 287.1 ± 60.5 | 284.2 ± 13.2 | 494.2 ± 57.3 | 675.3 ± 38.7 | 750.2 ± 69.2 | 423.2 ± 361.9 | 303.7 ± 274.0 | 1123.6 ± 46.9 | 885.3 ± 488.3 |
| Tensile Strength (psi) | 33.0 ± 3.9 | 41.9 ± 2.5 | 19.2 ± 1.0 | 24.8 ± 4.4 | 25.6 ± 3.6 | 31.9 ± 12.9 | 32.3 ± 4.6 | 26.2 ± 1.6 | 26.6 ± 3.2 |
| Tack Free time (hrs) | 2.0 | 12.0 | 22 | 15 | 30 | 2.0 | 12.0 | 22 | 15 |

While the foregoing is directed to embodiments of the present invention, other and further embodiments of the invention may be devised without departing from the basic scope thereof, and the scope thereof is determined by the claims that follow.

The invention claimed is:

1. A method of producing a composition comprising a crosslinkable silane-terminated polymer having at least one crosslinkable silyl group in each molecule, the method comprising:
   providing a polymer having at least one unsaturated group and at least one alcoholic hydroxyl group in each molecule and having a number average molecular weight of between about 100 and about 10000;
   adding to the polymer a compound having a hydrogen-silicon bond and a crosslinkable silyl group in each molecule and a hydrosilylation catalyst to thereby carry out a hydrosilylation reaction to form a composition comprising hydrosilylated polyoxyalkylene polymers, wherein the hydrosilylation reaction has a hydrosilylation efficiency of at least about 70% as determined by $^1$H-NMR;

reacting the hydrosilylated polyoxyalkylene polymers with at least one isocyanate at an isocyanate index of between about 80 and about 250 and in the presence of a first tin-free catalyst to form an isocyanate reacted hydrosilylated polymers, the first tin-free catalyst comprising at least one of zinc octoate, 1,8 diaza-bicyclo(5, 4,0) undecene-7, acid blocked 1,8 diaza-bicyclo(5,4,0) undecene-7, an organometallic titanium catalyst, or combinations thereof; and optionally reacting the isocyanate reacted hydrosilylated polymer with a polyol having a nominal functionality of at least 2 to form a polyol reacted crosslinkable silane-terminated polymer.

2. The method of claim 1, further comprising curing at least one of the isocyanate reacted hydro silylated polymers and the polyol reacted crosslinkable silane-terminated polymer in the presence of a second tin-free catalyst.

3. The method of claim 1, wherein the polymer having at least one unsaturated group and at least one alcoholic hydroxyl group in each molecule has a number average molecular weight of between about 4000 and about 10000, and wherein the index is between about 80 and about 100.

4. The method of claim 1, wherein the polymer having at least one unsaturated group and at least one alcoholic hydroxyl group in each molecule has a number average molecular weight of between about 100 and about 1000, and wherein the index is between about 160 and about 200.

5. The method of claim 2, wherein the second tin-free catalyst comprises at least one of dodecyl benzene sulfonic acid, acid blocked tertiary amine(1,8-Diazabicyclo[5.4.0]undec-7-ene) catalysts, and boron trifluoride amine complexes, or combinations thereof.

6. The method of claim 1, wherein the compound having a hydrogen-silicon bond and a crosslinkable silyl group comprises at least one of trimethoxysilane, triethoxysilane, methyldiethoxysilane, methyldimethoxysilane, phenyldimethoxysilane, trimethylsiloxymethylmethoxysilane and trimethylsiloxydiethoxysilane.

7. The method of claim 2, wherein the polymer having at least one unsaturated group and at least one alcoholic hydroxyl group in each molecule comprises a propylene glycol monoallyl ether having a number average molecular weight between about 600 and about 1000, and an OH number of between about 50 and about 90.

* * * * *